July 21, 1953  A. E. R. ARNOT  2,646,539
ELECTRIC MOTOR CONTROL SYSTEM
Filed April 14, 1949  4 Sheets-Sheet 1
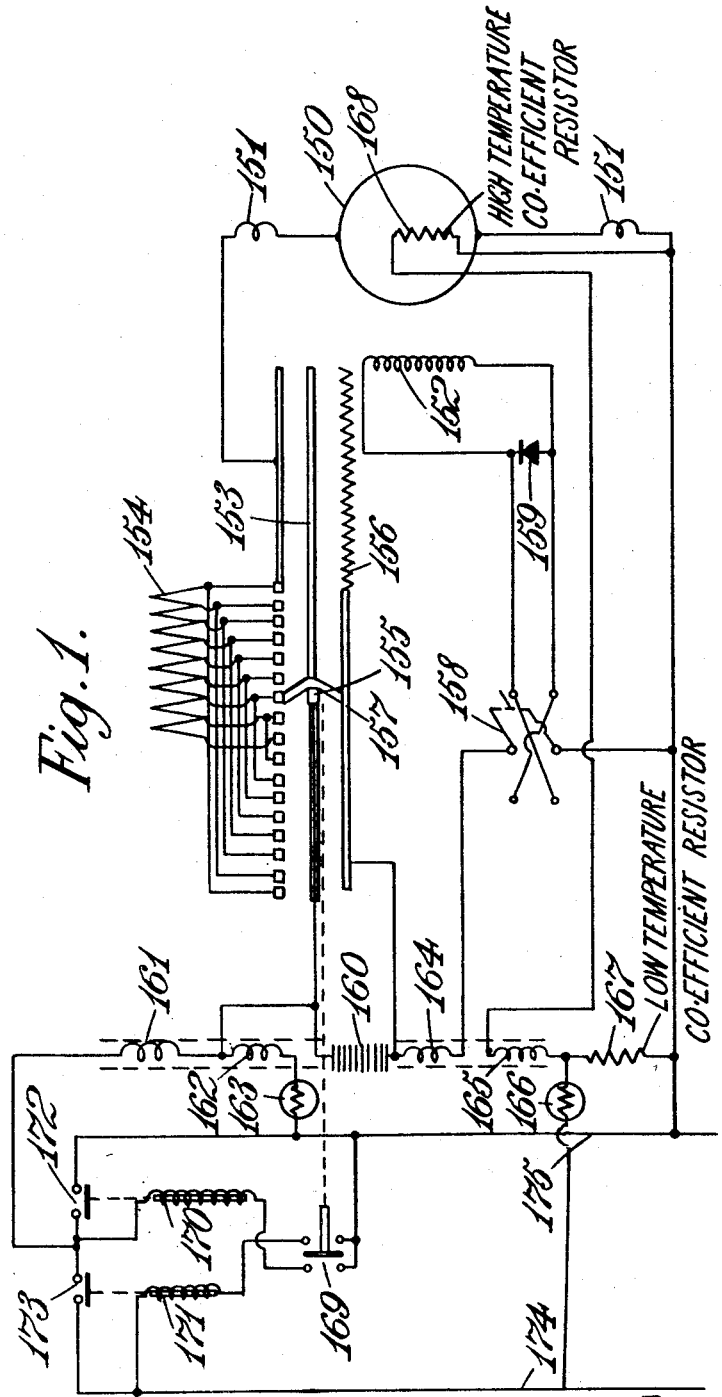
Inventor
Alfred Erwin Reginald Arnot
by Hasland F. Patrick  Atty

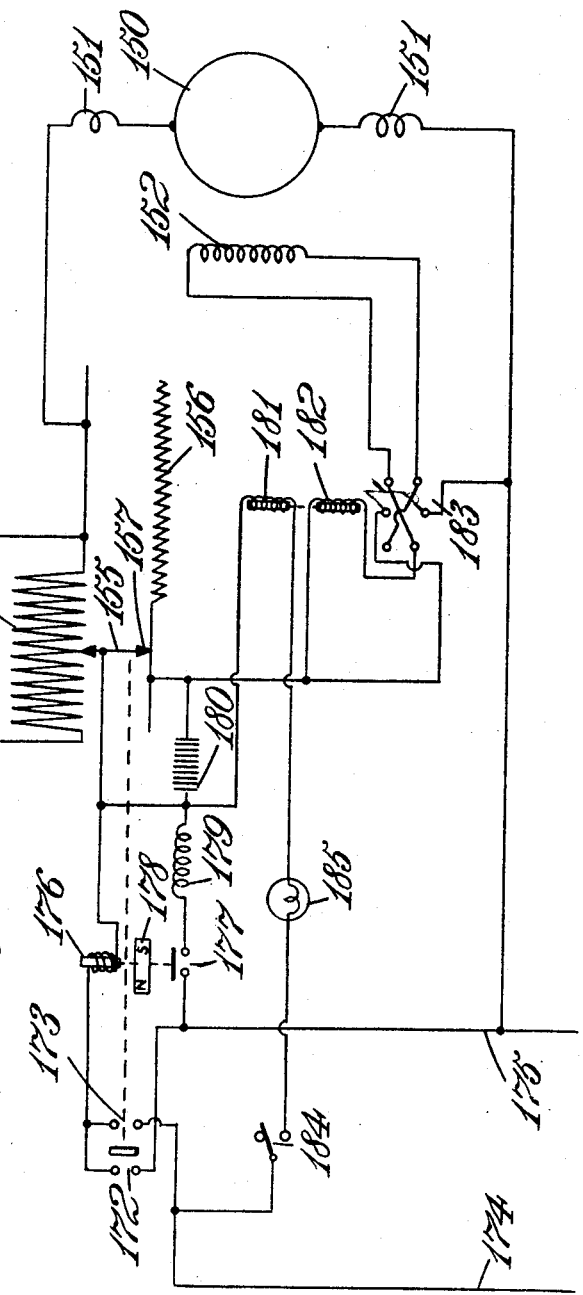

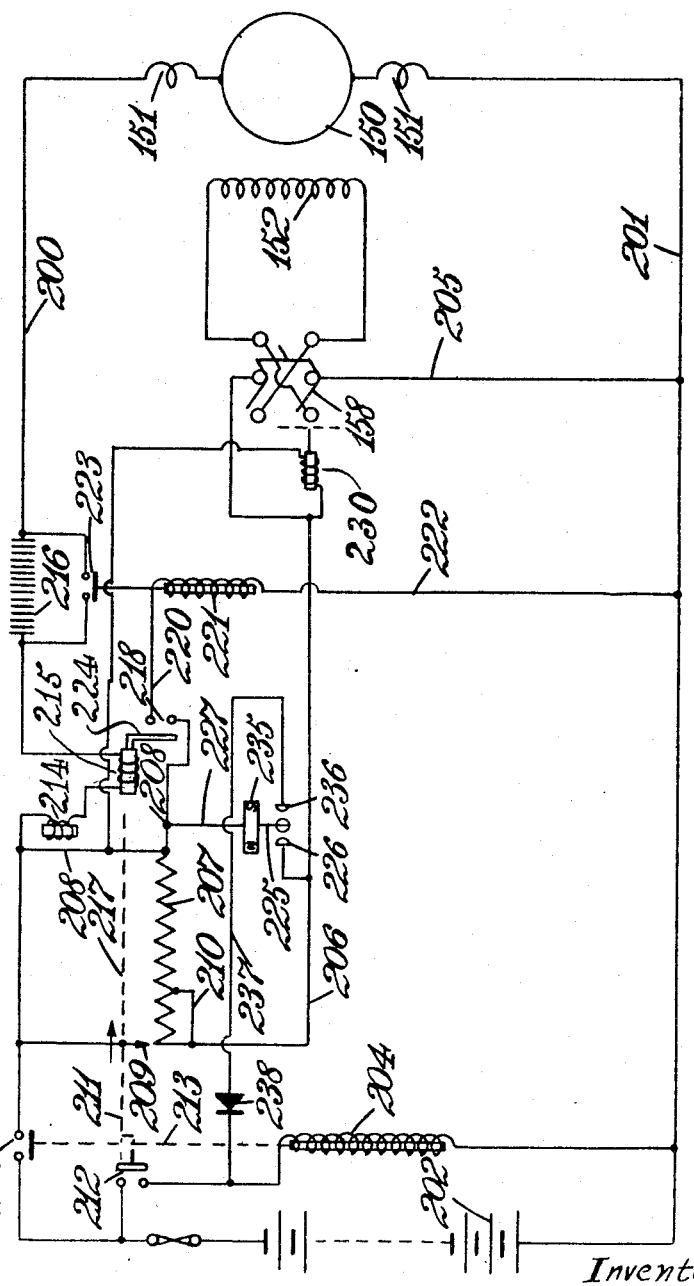

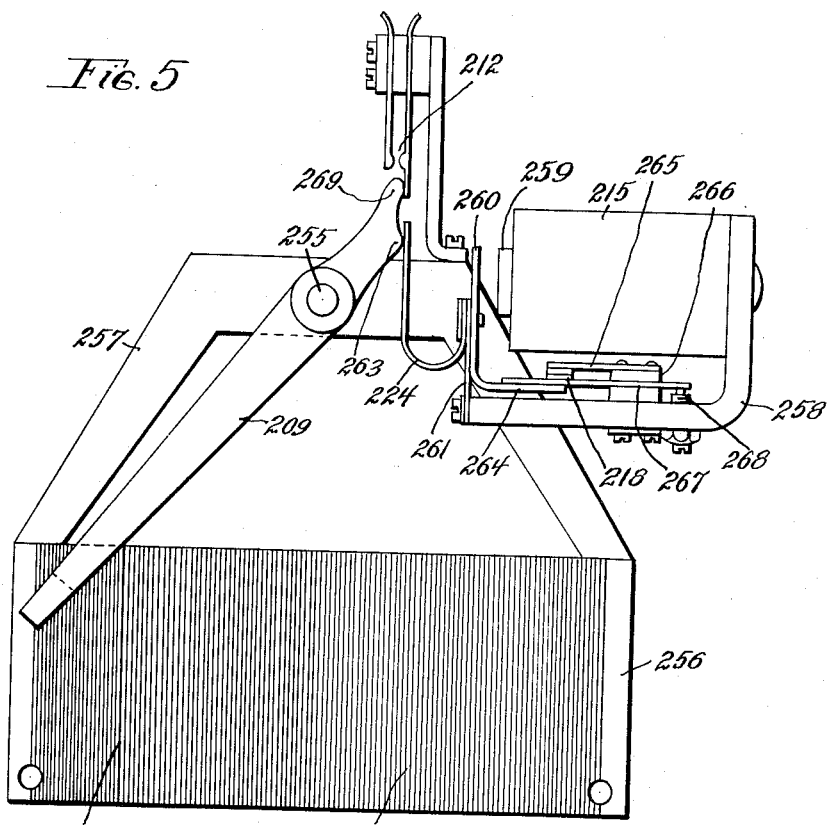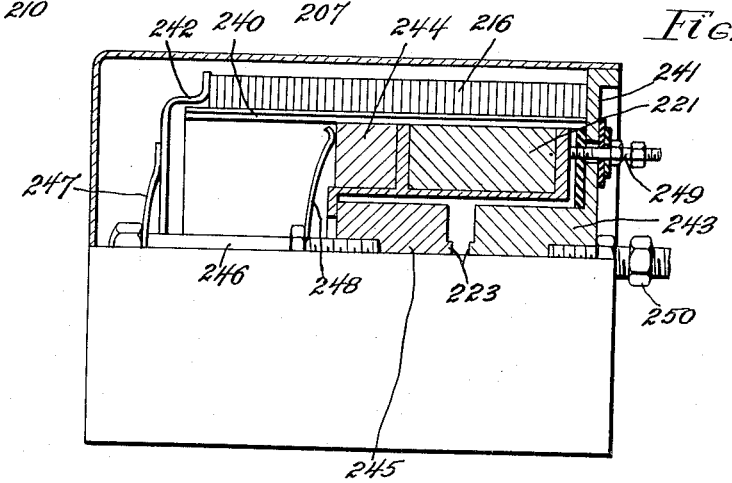

Patented July 21, 1953

2,646,539

UNITED STATES PATENT OFFICE 2,646,539

ELECTRIC MOTOR CONTROL SYSTEM

Alfred Erwin Reginald Arnot, Basingstoke, England, assignor to Emmanuel Kaye and John Reginald Sharp, both of Basingstoke, Hampshire, England Application April 14, 1949, Serial No. 87,530
In Great Britain April 16, 1948

13 Claims. (Cl. 318—259)

This invention comprises improvements in or relating to electric motor control gear.

It is an object of this invention to provide an installation comprising an electric motor and control gear therefor, which is characterised by possessing the advantages in dealing with heavy loads which are normally attributed to series wound motors but which is capable of simple speed regulation and of use regeneratively, that is to say, with the motor acting as a dynamo and serving to brake the apparatus to which it is connected.

According to the present invention, an installation comprising an electric motor and control gear therefor, in which the motor has a shunt field winding and the control gear comprises automatic regulating means for the shunt field of the motor such that it will automatically increase or decrease the field strength between certain limits as load on the motor increases or decreases, is characterised by the fact that a series starting resistance is employed for starting the motor on load in combination with manually-operated means to determine the rate of cutting out such resistance and means to ensure that the shunt field current is substantially at a maximum until all or substantially all the starting resistance has been cut out.

The limits between which the automatic regulating means for the field strength operate may also be controlled by the setting of the manually operated means.

The automatic means for varying the shunt field current may be of the type comprising a field-reducing resistance and a magnet coil in series with the motor armature current for cutting out or diminishing the value of the resistance. The field-reducing resistance may for example be a carbon pile resistance, the magnet acting to compress the carbon pile and so reduce the value of the resistance when load increases but to release it and so reduce field current when load decreases.

In one form of installation hereinafter described the series starting resistance is under direct manual control and a manually variable resistance for reducing the shunt field current is provided connected in parallel with the automatically operated means and arranged so as to be short circuited when the starting resistance is in circuit but to be put in circuit by further movement of the controller after the starting resistance has been cut out.

In an alternative apparatus the series starting resistance is provided with magnetic means for altering its value and manually-operated means to determine the rate of action of the magnetic means, that is to say, the rate at which the magnetic means alters the series starting resistance. For example, the armature series resistance may consist of a carbon pile and the magnetic means for altering its value may comprise a solenoid to act upon the carbon pile in combination with an electromagnetic switch actuated by current in series with the motor armature for determining the current at which the solenoid compresses the carbon pile.

The accompanying diagrams are given by way of example of possible arrangements in accordance with the invention. In the diagrams:

Figure 1 is a diagram of one circuit, having a direct manual control for the starting resistance;

Figure 2 is a diagram of an alternative circuit;

Figure 3 is a diagram of a circuit for the case of a magnetically-controlled starting resistance the rate of action of which is regulated by a manual control;

Figure 4 is a diagrammatic longitudinal section through the starting resistance of Figure 3, and Figure 5 is a diagrammatic side elevation of the manual controller including the shunt field resistance of the apparatus shown in Figure 3.

The circuit shown in the diagram of connections Figure 1 is a typical application to an electric railway train or trolley-bus. In such a system the line current is comparatively unimportant, the motor heating characteristics determining the permissible current; no declutching of the motor from the driving wheels is required as may be desirable for an industrial truck, and as the reversing switch is comparatively seldom used, a simple mechanically interlocked arrangement thereof is suitable. In the arrangement shown the very important feature of regenerative braking is combined with a further range of rheostatic braking.

The system consists of a motor 150 fitted with interpoles 151 and a shunt field 152; a controller 153 consists of a variable armature resistance 154 having a sliding contact 155 so coupled to a variable field resistance 156 having a sliding contact 157 that no field resistance is introduced until all armature resistance has been excluded; the reversing switch 158 is mechanically interlocked with the controller so that it can be operated only when the controller is in the neutral position as shown, whilst a surge-absorbing device 159 is arranged to prevent arcing of the field switching contacts; an automatic field regulating device is supplied in the form of a carbon pile regulator (which is more suitable for the heavier field currents of a railway traction motor than a vibrating relay), and consists of a carbon pile 160, a series operating coil 161, a polarising coil 162 fed through a barretter 163, a controlling coil 164 in series with the field winding which affects the motor current according to speed, and a modifying control coil 165 fed from a constant voltage source consisting of a barretter 166 in series with a resistance of negligible temperature co-efficient 167 drawing a current several times as great as the coil 165, which is itself connected in series with a governing resistance 168 of high temperature co-efficient located in the motor. A barretter, as defined by Chamber's Technical Dictionary, 1940, is "an iron wire resistance mounted in a glass bulb containing hydrogen, and having a temperature coefficient so arranged that the variation of resistance produced insures that the current in the circuit to which it is connected remains constant over a wide range of voltage."

A change-over switch 169 is coupled to the sliders 155, 157 of the controller 153 and adapted to energise the coils 170 or 171 of two contactors having contacts 172, 173. The two supply lines 174, 175 are arranged to take current from collector shoes or trailing cables as may be required.

In operation, the controller handle carrying sliders 155, 157 is moved slowly to the right; this operates switch 169 to energise coil 171, closing contacts 173 and applying full field to the motor at the same time as the armature is fed through the total resistance 154. The motor develops greater speed as the resistance 154 is decreased, until the motor is running on full field with the armature across the line. Further movement of the controller handle now inserts an increasing amount of field resistance in the circuit, thereby increasing motor speed. The carbon pile regulator is preferably designed with a characteristic such that it offers little change of resistance up to a set value of current in coil 161, then a rapid decrease of resistance for increasing current; the polarising coil 162 assists the coil 161 when motoring currents flow, but opposes regenerative currents, the barretter 163 being provided so that a constant current flow ensures constant characteristics irrespective of temperature or line voltage. If therefore, due to rapid insertion of field resistance or heavy loads with light field condition, the load current through coil 161 tends to increase above the set value mentioned above, the pile 160 will decrease the field resistance and maintain the pre-set current. The coil 164 is arranged to assist coil 161, and carries the field current which is a function of motor speed; hence as the motor runs faster and cooling improves, a higher permissible current may automatically be drawn. The coil 165 opposes coil 161, so that as the motor heats up, the resistance 168 increases, current in coil 165 drops and less current is required in coil 161 to operate the pile; this automatically reduces the load current according to motor heating characteristics.

If now the controller has been moved to the right and is moved back, the field is first increased and current is regenerated into the lines 174, 175, the polarising coil 162 ensuring that the pile has no effect during regeneration. When the field has been increased to a maximum, regeneration ceases and armature resistance is reintroduced until switch 169 operates, de-energises coil 171 and opens contacts 173; comparatively little arcing can take place on these contacts as the vehicle will still be running at such a speed that the motor back E. M. F. is substantially the same as the line E. M. F., and in any case the full resistance 154 is in series with the armature.

Further movement of the controller to the left causes switch 169 to energise coil 170, which closes contacts 172 and connects the resistance 154 in parallel with the motor for rheostatic braking; the resistance is gradually reduced until it becomes a short-circuit, and no further braking takes place unless the mechanical brakes are arranged to operate with still further movement of the controller handle. It will be noted that in the event of an open-circuited supply line which would make regeneration impossible, the rheostatic braking will operate in any case to ensure safety.

In the event of a number of motors being required to run together on one train with a fair measure of load sharing, it will be seen that with a controller as shown in Figure 1 the condition of having a pure shunt motor on full field and without armature resistance can arise; thus any motor tending to run faster than others on the same train will try to supply the entire tractive effort and probably burn out. In order to prevent this and give the motors an elastic characteristic over the whole range of control, the sliders 155, 157 may be staggered so that field resistance starts to be introduced before all the armature resistance is cut out. This ensures that the motors are either running on full field but with a measure of armature resistance, or with no armature resistance but a margin of automatic field control.

The starting resistance 154 may be any known kind of variable resistance, such as a brush sliding over resistance wires or studs connected to a resistance bank; a liquid resistance with submersible electrodes; a carbon pile under compression, or the like. Furthermore, if the circuit is applied to diesel-electric trains or the like, the initial current may be regulated by variation of the generator field without the inclusion of any series armature resistance; the circuit may also be arranged so that the means responsive to motor armature current are used to control the generator field.

Figure 2 shows the addition of a "preselector" reversing circuit to the circuit of Figure 1. At the same time the resistance 154 has been shown as a potentiometer type whilst the current control is by a carbon pile 180 having an operating coil 179 energised through the contacts 177 of a vibrating relay having an operating coil 176 and a polarising magnet 178. The main contacts 172, 173 have been shown as mechanically operated and connected to the sliders 155, 157.

The reversing system consists of a reversing switch 184 and a relay comprising two operating coils 181, 182 and change-over contacts 183. A warning light 185 is fitted to give visible indication that the circuit is set for reverse motion. In operation, if the switch 184 is open, the coil 181 is not energised, the contacts 183 remain set and operation of the controller will close contacts 173, 172 to start the installation in a forward direction. Closing of the switch 184 will now produce no effect, as with contacts 173 closed there will be no operating potential in the circuit of coil 181. As soon as the controller is returned to open contact 173, coil 181 will be energised by the difference between line voltage and the motor back E. M. F.; this difference will not be sufficiently great to operate the contacts 183 until the back E. M. F., and hence field current, is so low that no undue arcing of the contacts 183 can occur. Thus, as the motor comes substantially to rest the contacts 183 will change over, and the lamp 185 will light. Operation of the controller will now close contacts 173 and de-energise coil 181 but coil 182 is now connected across the field circuit and will continue to hold in the contacts 183 until the controller again opens contacts 173 and the field current has dropped to a very low value. In other respects the circuit shown in Figure 2 operates similarly to the circuit shown in Figure 1, the carbon pile 180 being actuated by the coil 176 in a similar way to that in which the carbon pile 160 of Figure 1 is operated by the coil 161, and the resistance 156 being cut out until just before the resistance 154 has been cut out so that until the motor has been started and substantially all the resistance 154 has been eliminated from the circuit the action of the carbon pile 180 is ineffective.

Referring now to Figures 3 to 5, the motor 150 with interpoles 151 is connected by a line 201 to the negative pole of a battery 202 and by line 200 through a series resistance 216 and main contactor contacts 203 which are closed to the positive pole of battery 202 when an operating coil 204 for the contactor is energised. The motor 150 has a shunt field winding 152 which is connected through a reversing switch 158 on the one hand to the negative line 201 through line 205 and on the other hand through line 206 to a shunt field regulating resistance 207 and thence by a connection 208 to the positive line on the motor side of the contacts 203. A field regulating control member 209 moves over the resistance 207 so as to be capable of inserting part or all of the resistance 207 into effective connection in series with the field winding 152. The control member 209 in the first part of its movement moves over some turns 210 of the resistance 207 which do not afford any effective resistance and are therefore shown in the diagram as short circuited. In this initial part of the movement of the control member 209 the field winding 152 will therefore receive full voltage from the battery 202 as soon as the contacts 203 are closed. The control member 209 is mechanically connected as indicated by the dotted line 211 to contacts 212 so that the first action of the controller is to close the contacts 212. The contacts 212 are in series with the operating coil 204 of the main contactor through the line 213 and as soon as the contacts 212 are closed the contactor closes the contacts 203 and current flows to the motor through coils 214, 215 hereinafter referred to and starting resistance 216. The control member 209 is also mechanically connected as indicated by the dotted line 217 to the contacts 218 so as to close them after the contacts 212 have been closed. The contacts 218, when closed through connection 219, connect the line 208 to a line 220 which leads to an operating coil 221 the other end of which is connected by a line 222 to the negative line 201. The coil 221 is a solenoid coil for operating the carbon pile starting resistance 216 and it serves to compress the starting resistance and reduce it until at the point of maximum compression it closes contacts 223 which finally short circuit the starting resistance. The cutting-out of the carbon pile starting resistance does not however proceed instantaneously; the rate at which the resistance is cut out is under manual control and this is effected as follows: The contacts 218 are not directly closed by the movement of the control member 209 but the control member 209 operates upon them by varying the effect of a spring 224 which tends to open them against a spring 267 (Figure 5) which tends to hold them closed. On the other hand the series magnet 215 tends to open them. When the contacts 218 are opened by the magnet 215 the circuit of the solenoid coil 221 is broken and the pressure on the carbon pile is released. Consequently the starting current cannot rise above the value at which the coil 215 will open the contacts 218 and the solenoid 221 continually checked in its efforts to compress the carbon pile 216 and is only able to compress it further (at a given manual setting of the controller) as the motor speeds up. The effect of the spring 224 is that it presses more or less upon the contacts 218 and the current required to open the contacts against the spring will depend upon the adjustment of the spring 224 which is under manual control by its operative connection to the manual control member 209. Therefore, the operator can determine by the position to which he moves the control member 209, the amount of the starting current to which the motor 150 is limited by the operation of the solenoid 221. The mechanical arrangement of the parts for this purpose is hereinafter described with reference to Figure 5 of the drawings.

The operating coil 214, which is also in series with the motor 150 serves to close a movable contact member 225 against a contact 226. When the contacts 225, 226 are closed together they short circuit, through connections 227, 206, the field regulating resistance 207. Therefore, when the motor has been brought up to speed, if the operator moves the control member 209 along the resistance 207 so as to put regulating resistance in series with the field winding, should the motor take a current great enough for the coil 214 to operate the contact 225, the contacts 225, 226 will be closed and the field resistance will be short circuited thus increasing the current in the field winding and correspondingly reducing the current in the armature circuit and the speed of the motor. The result will be that the contact 225 will open again and the operation will be cyclically repeated, with the contact 225 vibrating and the amount of the field current will determine itself so that the motor armature current will not rise above that required to close the contacts 225, 226. This gives the motor 150 a characteristic when operating under control of the vibrating contacts which is similar to the characteristic of a series wound motor but with the important differences that the speed drops with a substantially constant armature current and that the shunt field gives a ceiling to the maximum speed.

In the diagram there is shown an interlock control coil 230 which is connected by lines 231, 232 to the motor side of contacts 203 and the negative line 201 so that it is energised as long as the motor 150 is receiving current or possesses any back E. M. F. As long as the coil 230 is energised the interlock bolt 233 is held in engagement with a part 234 of the reversing switch 158 and prevents reversal of the field winding 152. As soon as the motor becomes "dead" the field winding can be reversed.

The coil 214 and vibrating contact 225 are polarised, which is indicated in the diagram by a polarising magnet 235. In the event of the vehicle on which the installation is placed running downhill or otherwise overtaking its own power supply, the current through coil 214 is reversed and the contact 225 makes contact with another contact 236 which is connected to the contact 218 and ensures that in whatever position the operator places the manual control member 209 the solenoid 221 will be kept energised and the resistance 216 will be cut out. At the same time a connection 237 to a rectifier unit 238 and thence to the line 213 is completed and this ensures that the contactor coil 204 will be kept in operation even if the operator opens the contacts 212. The motor will therefore pump current back regeneratively into the battery 202 and the speed of the vehicle will be kept down to the running speed of the motor.

Referring to Figure 4, this shows the construction of the carbon pile 216 and its relation to the operating coil 221. The carbon pile 216 consists of a series of carbon rings which are threaded upon a vitreous-enamelled sleeve 240 and which bear at one end upon a disc 241 while they are pressed upon at the other end by a movable pressure-disc 242. The coil 221 is within the sleeve 240 which, being of steel, serves to complete its magnetic circuit, together with the disc 241, a core 243 and an end ring 244 of magnetic material. Within the coil 221 is a solenoid armature 245 which carries a pull rod 246 passing through the movable end disc 242. A spring 247 on the pull rod 246 transmits the pressure to the disc 242 and also ensures that the solenoid core 245 is in electrical connection with the movable pressure disc 242. Another spring 248 on the rod 246 makes electrical connection between the rod and the magnetic ring 244, which is firmly secured in electrical connection with the sleeve 240. The sleeve 240 is insulated from the carbon rings 216 by reason of its vitreous-enamelled external surface. In the position of the parts shown in the drawing, therefore, current passes from a central terminal 250 into the disc 241 and thence through the carbon rings to the movable pressure disc 242 and by way of the springs 247, 248 to the magnetic ring 244 and sleeve 240. The sleeve 240 is in electrical connection with an insulated terminal 249 secured in the disc 241. Insulated leads, not shown in the drawing, are taken to the coil 221. The solenoid core 245 carries a contact 223 which, when full pressure is applied to the carbon pile, makes contact with the contact 223 on the core 243 and so short circuits the pile. The contacts 223 correspond to the contacts 223 of Figure 3.

Figure 5 of the drawing shows the manual control. On a rock shaft 255 there is mounted a manual control member 209 which is capable of moving over the turns of shunt field regulating resistance 207 wound upon an insulating block 256 and connected to the rock shaft 255 by a supporting frame 257. Screwed to the frame 257 is a magnet frame 258 which carries a magnet coil 215 corresponding to the coil 215 of Figure 3. The magnet coil 215 has a core 259 which is capable of attracting an armature 260 supported on a spring 261. A second flat spring 224 is secured to the back of the armature 260 and is curved upwards so as to bear against a tail-cam 263 on the manual control member 209. This is the mechanical connection indicated by the dotted line 217 in Figure 3. The armature 260 is bent at right-angles as shown at 264 so as to extend under the coil 215 and it carries a movable contact member 219 which makes contact with the end of a contact arm 265 carried on an insulated bracket 266 on the magnet frame 258. A spring 267 extends from the part 264 of the armature into engagement with an adjusting screw 268. The result is that if the manual control member 209 is moved into the position shown in Figure 5 where the tail-piece 263 compresses the spring 262, the pressure of the spring 262 makes it easier for the coil 215 to attract the armature 260 and break the contacts at 218. If the manual control member 209 is moved by working the rock shaft 255 so that the lower end of control member 209 moves to the right as viewed in Figure 5, the pressure of the tail-piece 263 on the spring 262 is more or less relieved and it becomes harder for the coil 215 to operate the armature. This increases, therefore, the starting current of the motor 150 at which it will operate the carbon pile 216 by the solenoid 221 in the manner already explained. The first few turns 210 of the winding 207 are made of copper wire of negligible resistance and in moving over this part of the winding 207 the control member 209 makes no difference to the resistance in the field circuit but serves only as a manual regulator of the starting current. A secondary tail-piece 269 serves to break the contacts 212 in the extreme left hand position of the control member but to allow them to close as soon as the control member is moved away from that position. The tail-piece 269 corresponds to the mechanical connection 211 indicated in the connection diagram, Figure 3.

I claim:

1. A traction motor control installation comprising in combination with a traction motor having a shunt field winding, automatic regulating means for the shunt field of the motor to vary automatically the field strength of the shunt field winding as the load on the motor varies, a variable starting resistance in series with the motor armature, a main switch for connecting the motor and starting resistance to a source of electric current, manually operated control means having an initial movement to cause the main switch to be closed and further movement to determine the rate of cutting out of the variable starting resistance, and a variable field resistance connected in parallel with the automatic regulating means for the shunt field for reducing the shunt field current and operatively connected to the manually operated control means to be actuated thereby to prevent the automatic regulating means for the shunt field winding from decreasing the field strength of the shunt field winding until the starting resistance has been substantially cut out and to increase said field resistance by further movement of said control means after the starting resistance has been cut out.

2. An installation as claimed in claim 1, wherein the manually-operated control means are capable of movement in the opposite direction from that required for causing the main switch to be closed and are combined with means for inserting a resistance in the armature circuit of the motor in the event of such opposite movement and with means for completing a rheostatic braking circuit through said resistance.

3. An installation as claimed in claim 1, wherein the means for reversing the connection of the shunt field winding comprises a manually-operable reversing switch interconnected with the manually-variable starting resistance so that it can only be operated when the motor is de-energized.

4. A traction motor control installation comprising in combination with a traction motor having a shunt field winding, automatic regulating means for the shunt field of the motor to vary automatically the field strength of the shunt field winding as the load on the motor varies, including a magnet coil in series connection with the motor armature current, contacts operated by said magnet coil for diminishing the value of the shunt field resistance and a polarizing member for ensuring that the magnet does not operate the contacts if the current is reversed, a variable starting resistance in series with the motor armature, a main switch for connecting the motor and starting resistance to a source of electric current, manually operated control means having an initial movement to cause the main switch to be closed and further movement to determine the rate of cutting out of the variable starting resistance, and means operatively connected to the manually operated control means to be actuated thereby to prevent the automatic regulating means for the shunt field winding from decreasing the field strength of the shunt field winding until the starting resistance has been substantially cut out.

5. An installation as claimed in claim 4, wherein the polarizing member is an electromagnet connected to the supply connections through means for regulating the polarizing current to keep the amount thereof constant.

6. A traction motor control installation comprising in combination with a traction motor having a shunt field winding, automatic regulating means for the shunt field of the motor to vary automatically the field strength of the shunt field winding as the load on the motor varies including a magnet coil in series connection with the motor armature current, contacts operated by said magnet coil for diminishing the value of the shunt field resistance and a biasing coil in series with the shunt field winding aiding said magnet coil in diminishing the value of said shunt field resistance, a variable starting resistance in series with the motor armature, a main switch for connecting the motor and starting resistance to a source of electric current, manually operated control means having an initial movement to cause the main switch to be closed and further movement to determine the rate of cutting out of the variable starting resistance, and means operatively connected to the manually operated control means to be actuated thereby to prevent the automatic regulating means for the shunt field winding from decreasing the field strength of the shunt field winding until the starting resistance has been substantially cut out.

7. An installation as claimed in claim 6, wherein a further modifying magnet coil is provided for the automatic field regulating means and a governing resistance therefor is located in the electric motor, the governing resistance and modifying magnet being so connected together and to the supply that as the motor heats up the automatic field regulating means operates at a lower armature current.

8. A traction motor control installation comprising in combination with a traction motor having a shunt field winding, automatic regulating means for the shunt field of the motor to vary automatically the field strength of the shunt field winding as the load on the motor varies, a variable starting resistance in series with the motor armature having magnetic means for altering its value and manually operated means to determine the rate of action of said magnetic means, a main switch for connecting the motor and starting resistance to a source of electric current, manually operated control means having an initial movement to cause the main switch to be closed and further movement to determine the rate of cutting out of the variable starting resistance, and means operatively connected to the manually operated control means to be actuated thereby to prevent the automatic regulating means for the shunt field winding from decreasing the field strength of the shunt field winding until the starting resistance has been substantially cut out.

9. An installation as claimed in claim 8, wherein the armature series resistance consists of a carbon-pile and the magnetic means for altering its value comprises a solenoid to act upon the carbon-pile in combination with an electromagnetic switch actuated by current in series with the motor armature for determining the current at which the solenoid compresses the carbon-pile.

10. An installation as claimed in claim 9, wherein a resistance having a manually-variable control is provided for reducing the shunt field current and is operatively connected to the said electromagnetic switch so that initial movement of the manually-variable control varies the current at which the electromagnetic switch causes the solenoid to press the carbon-pile while subsequent movement of the control serves to insert shunt field resistance and thereby to permit the automatic means for varying the shunt field current to become effective.

11. An installation as claimed in claim 2, wherein a series of rheostatic braking contacts are provided for cooperation with the manually-operated control means, which contacts are so located as to be engaged by the control means upon the execution of said opposite movement and said contacts are connected to the same resistance as that employed as the starting resistance.

12. An installation as claimed in claim 3, wherein the means for reversing the motor comprises a magnetically-operated reversing switch and an operating magnet therefor connected in a circuit such that it can only be operated when the manually-variable starting resistance is returned to the starting position and the field is de-energized.

13. An installation as claimed in claim 12, wherein the magnet circuit of the reversing switch is controlled by a preselector switch which can be operated by the operator at any time for the purpose described.

ALFRED ERWIN REGINALD ARNOT.

References Cited in the file of this patent
UNITED STATES PATENTS

| Number | Name | Date |
| --- | --- | --- |
| 865,814 | Powell | Sept. 10, 1907 |
| 1,340,679 | Whittingham | May 18, 1920 |
| 1,419,178 | Stevens | June 13, 1922 |
| 1,439,892 | Horton | Dec. 26, 1922 |
| 1,752,179 | James | Mar. 25, 1930 |
| 2,262,379 | Austin | Nov. 11, 1941 |
| 2,347,037 | Edwards et al. | Apr. 18, 1944 |
| 2,424,255 | Schaelchlin et al. | July 22, 1947 |